US012673509B2

(12) United States Patent
Jia et al.

(10) Patent No.: US 12,673,509 B2
(45) Date of Patent: Jul. 7, 2026

(54) STRUCTURE FOR AUTOMATICALLY MEASURING PAPER WIDTH FOR PRINTER

(71) Applicant: GUANGZHOU MUNBYN INFORMATION TECH CO LTD, Guangzhou (CN)

(72) Inventors: Zhuo Jia, Guangzhou (CN); Jinpeng Yuan, Guangzhou (CN); Shuzhong Liu, Guangzhou (CN); Dongrui Li, Guangzhou (CN); Qi Wang, Guangzhou (CN)

( * ) Notice: Subject to any disclaimer, the term of this patent is extended or adjusted under 35 U.S.C. 154(b) by 129 days.

(21) Appl. No.: 18/829,294

(22) Filed: Sep. 10, 2024

(65) Prior Publication Data

US 2026/0014806 A1 Jan. 15, 2026

(51) Int. Cl.
*B41J 11/00* (2006.01)
*B41J 29/00* (2006.01)
*B41J 29/393* (2006.01)

(52) U.S. Cl.
CPC ............. *B41J 11/003* (2013.01); *B41J 29/00* (2013.01); *B41J 29/393* (2013.01)

(58) Field of Classification Search
CPC ......... B41J 11/003; B41J 29/00; B41J 29/393
See application file for complete search history.

(56) References Cited

U.S. PATENT DOCUMENTS

2017/0001816 A1* 1/2017 Ichikawa ............... B65H 1/266

FOREIGN PATENT DOCUMENTS

| | | | | |
|---|---|---|---|---|
| JP | 2001240290 A | * | 9/2001 | ............. B65H 31/32 |
| JP | 2013230886 A | * | 11/2013 | ............... B65H 1/00 |
| WO | WO-2023022700 A1 | * | 2/2023 | .............. B41J 15/16 |

* cited by examiner

*Primary Examiner* — Yaovi M Ameh
(74) *Attorney, Agent, or Firm* — Sandy Lipkin

(57) ABSTRACT

The invention is a structure for automatically measuring a paper width for a printer, including: a width adjustment mechanism installed in the printer and at least one restraint arm driven by the width adjustment mechanism, where an inductor is also arranged inside the printer, the width adjustment mechanism or the restraint arm comes into contact with the inductor when sliding unidirectionally, and the inductor outputs a corresponding displacement signal. Benefits of the utility model are as follows: The inductor is arranged inside the printer, and in this way, during use, the user can directly manually push the restraint arm or control the width adjustment mechanism to drive the restraint arm, so that the restraint arm properly clamps the paper.

8 Claims, 2 Drawing Sheets

STRUCTURE FOR AUTOMATICALLY MEASURING PAPER WIDTH FOR PRINTER

CROSS REFERENCE TO RELATED APPLICATIONS

The present application claims the priority of Chinese patent application No. 2024216525846, filed on Jul. 12, 2024, and contents of which are incorporated herein by reference.

TECHNICAL FIELD

The utility model relates to the technical field of printers, and in particular, to a structure for automatically measuring a paper width for a printer.

TECHNICAL BACKGROUND

A paper width adjustment mechanism is provided inside a printer, so that the paper width adjustment mechanism can be controlled to clamp paper in response to a paper size input by a user, to ensure that the paper can pass through a printing area of the printer properly and smoothly, thereby avoiding problems such as a paper jam and printing dislocation caused by a mismatched paper size. Therefore, the user needs to set a length and a width of the paper in an application on a computer or a mobile phone, and send a size control instruction to the printer synchronously, and the printer controls the paper width adjustment mechanism to move according to the instruction, to clamp to-be-printed paper.

However, when the user has no measuring tool or has difficulty in obtaining the paper size, the user is unlikely to know how to set the paper size. Therefore, if the size is set to be inconsistent with an actual size of the paper, a fault such as offset, missing, or cross-page printing of to-be-printed text or patterns may be caused, resulting in a waste of consumables such as paper and ink.

SUMMARY

In view of the foregoing problem, the utility model proposes a structure for automatically measuring a paper width for a printer, which are mainly intended to resolve an existing problem that the printer lacks a paper width measuring function.

To resolve the foregoing technical problem, the utility model discloses a structure for automatically measuring a paper width for a printer, including: a width adjustment mechanism installed in the printer and at least one restraint arm driven by the width adjustment mechanism, where an inductor is also arranged inside the printer, the width adjustment mechanism or the restraint arm comes into contact with the inductor when sliding unidirectionally, and the inductor outputs a corresponding displacement signal.

In some embodiments, the width adjustment mechanism includes an adjustment gear and a right rack and a left rack meshing with upper and lower ends of the adjustment gear respectively, a restraint arm is fixed at each remote end of the right rack and the left rack, and an upper end surface of the right rack comes into contact with the inductor when sliding under drive of the adjustment gear.

In some embodiments, the two restraint arms are arranged in parallel at the paper inlet of the printer.

In some embodiments, a guide slope is arranged on one side, closer to the inductor, of the upper end surface of the right rack.

In some embodiments, the guide slope forms a fillet or a chamfer.

In some embodiments, the inductor is a multipoint contact induction sensor, and a distribution direction of contact points on a surface of the contact induction sensor is consistent with a sliding direction of the right rack.

In some embodiments, a hemispherical bump is arranged on one side, closer to the inductor, of an upper end surface of the right rack, the bump is located in a vertical plane formed by multiple contact points, and the bump sequentially comes into contact with the contact points on the inductor when driven to slide.

In some embodiments, the bump is detachably installed on the upper end surface of the right rack.

In some embodiments, a height for installing the inductor is adjustable.

In some embodiments, the structure also includes a signal transmitter coupled with the inductor, and the signal transmitter unidirectionally sends, to a mobile device or a computer with which communication has been established, a displacement signal output by the inductor.

Benefits of the utility model are as follows: The inductor is arranged inside the printer, and in this way, during use, the user can directly manually push the restraint arm or control the width adjustment mechanism to drive the restraint arm, so that the restraint arm properly clamps the paper. The width adjustment mechanism or the restraint arm comes into contact with the inductor when sliding, the paper width is indirectly measured according to a displacement signal output by the inductor, and the user can send, to the host computer, a displacement obtained by the inductor and determine the actual paper width through the preset mapping relationship in the host computer without needing a length measurement tool.

Figure 1:
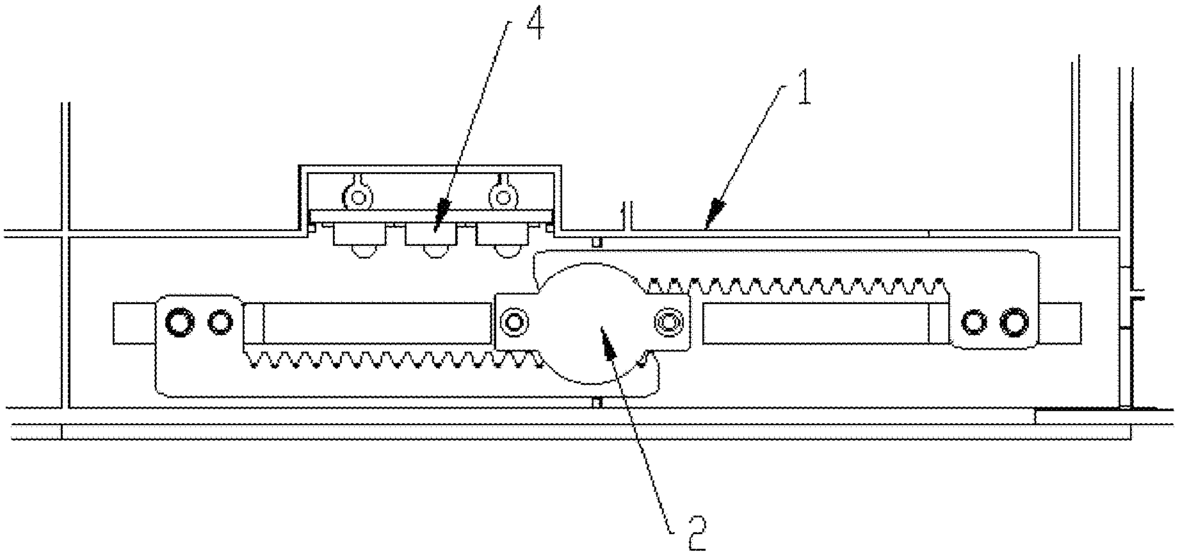
FIG. 1 is a schematic structural diagram of a structure for automatically measuring a paper width for a printer disclosed in an embodiment of the utility model.

Reference signs: 1—printer, 2—width adjustment mechanism, 3—restraint arm, 4—inductor, 201—adjustment gear, 202—left rack, 203—right rack, 204—guide slope, and 205—bump.

DETAILED DESCRIPTION OF EMBODIMENTS

To make the purpose, the technical solution and the advantage of the utility model clearer and more explicit, content of the utility model is further described in detail below with reference to the accompanying drawings and embodiments. It should be understood that, the embodiments described here are only intended to explain the utility model rather than limit the utility model. In addition, it should also be noted that, for ease of description, only some contents related to the utility model other than all the contents are shown in the drawings.

Figure 2:
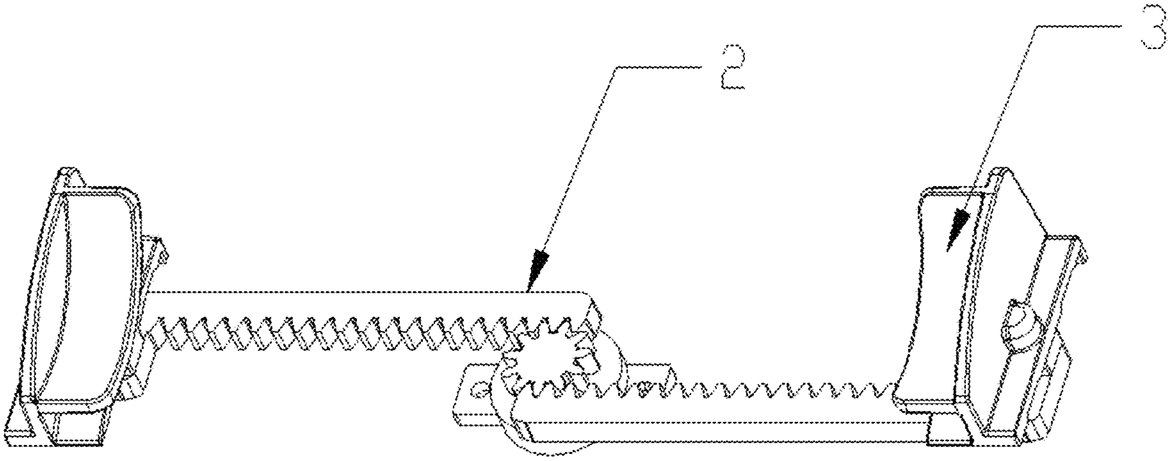
FIG. 2 is a schematic diagram of a connection between a width adjustment mechanism and a restraint arm.

This embodiment discloses a structure for automatically measuring a paper width for a printer. As shown in FIG. 1 and FIG. 2, the structure includes: a width adjustment mechanism 2 installed in the printer 1 and at least one restraint arm 3 driven by the width adjustment mechanism 2, where an inductor 4 is also arranged inside the printer 1, the width adjustment mechanism 2 or the restraint arm 3 comes into contact with the inductor 4 when sliding unidirectionally, and the inductor 4 outputs a corresponding displacement signal. It should be noted that, the foregoing restraint arm 3 is used to limit the paper width, and there should be at least one restraint arm 3. In this case, one side of the paper can be fixed with one restraint arm 3, and the other side of the paper is fixed with one end of the paper inlet of the printer 1. Optionally, a solution of double restraint arms can also be adopted, and two restraint arms 3 can be used to fix the two sides of the paper.

In this embodiment, the inductor 4 is arranged inside the printer 1, and in this way, during use, the user can directly manually push the restraint arm 3 or control the width adjustment mechanism 2 to drive the restraint arm 3, so that the restraint arm 3 properly clamps the paper. The width adjustment mechanism 2 or the restraint arm 3 comes into contact with the inductor 4 when sliding, the paper width is indirectly measured according to a displacement signal output by the inductor 4, and the user can send, to the host computer, a displacement obtained by the inductor 4 and determine the actual paper width through the preset mapping relationship in the host computer without needing a length measurement tool.

Figure 3:
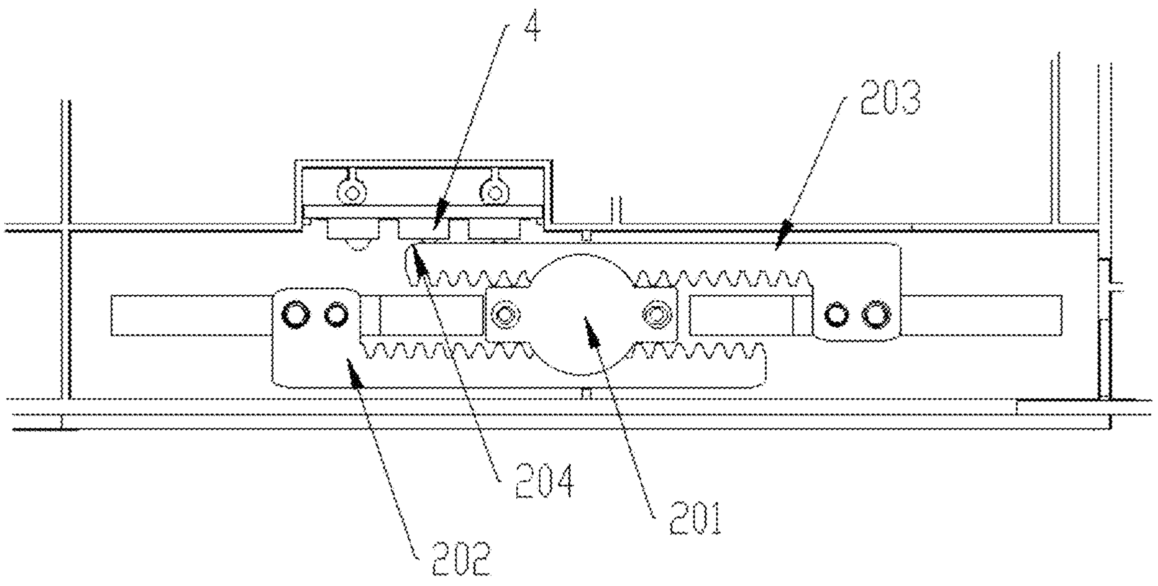
FIG. 3 is a schematic structural diagram of a width adjustment mechanism disclosed in an embodiment of the utility model.

In the utility model, either of the width adjustment mechanism 2 or the restraint arm 3 can be used as a part specifically in contact with the inductor 4. In an optional solution, taking, as an example, the width adjustment mechanism 2 serving as a contact member, as shown in FIG. 3, the width adjustment mechanism 2 includes an adjustment gear 201 and a right rack 203 and a left rack 202 meshing with upper and lower ends of the adjustment gear 201 respectively, a restraint arm 3 is fixed at each remote end of the right rack 203 and the left rack 202, and an upper end surface of the right rack 203 comes into contact with the inductor 4 when sliding under drive of the adjustment gear 201. Taking manual pushing of the restraint arm 3 on the right rack 203 as an example, assuming that the right rack 203 slides towards the inductor 4, an upper surface of the right rack 203 continuously comes in contact with detection points on the inductor 4 during sliding, to detect a route of the right rack 203 and output a corresponding displacement signal accordingly. In this case, the adjustment gear 201 rotates counterclockwise, and drives the left rack 202 to slide rightward, to synchronously control the two restraint arms 3. In the foregoing solution, when the manner of manually driving the restraint arm 3 is adopted, the adjustment gear 201 is only used as a connecting member between the right rack 203 and the left rack 202; but, when a manner of electrically driving the restraint arm 3 is adopted, rotation of the adjustment gear 201 can be controlled by the motor, and two restraint arms 3 are controlled to move towards each other to clamp the paper. Optionally, start and stop of the motor can be controlled by the sensor via, for example, visual detection or sensor detection. When the restraint arm 3 comes into contact with the paper, the motor stops rotating immediately.

Specifically, the two restraint arms 3 are arranged in parallel at the paper inlet of the printer 1, and the maximum opening width of the two restraint arms 3 should not exceed a width of the paper inlet.

A guide slope 204 is arranged on one side, closer to the inductor 4, of the upper end surface of the right rack 203, and the guide slope 204 optionally forms a fillet or a chamfer, to smooth a head of the right rack 203, thereby preventing the head of the right rack 203 from colliding with the inductor 4.

In an example, the inductor 4 is a multipoint contact induction sensor, and a distribution direction of contact points on a surface of the contact induction sensor is consistent with a sliding direction of the right rack 203. That is, a contact induction sensor consists of sensors 1, 2, 3, . . . . In this solution, the foregoing displacement signal is further simplified as a state of the sensor, and as shown in Table 1 below, when signals output by the sensor 1, the sensor 2, and the sensor 3 are 1, 0, and 0 respectively, it indicates that the right rack 203 only comes into contact with the sensor 1, and in this case, the paper width is W2.

Obviously, because the adjustment gear 201 is used as the connecting member in this solution, the right rack 203 and the left rack 202 move towards or opposite to each other, covering the same distance, and on this basis, a displacement change of the right rack 203 is equivalent to one-half of a change in the paper width. That is, a distance between the adjacent sensors is one-half of widths of the two types of adjacent paper, which can be used as a design reference for Table 1.

TABLE 1

Mapping Relationships Between States of Sensors and Paper Widths

| State of sensor 1 | State of sensor 2 | State of sensor 3 | Paper widths |
|---|---|---|---|
| 0 | 0 | 0 | W1 |
| 1 | 0 | 0 | W2 |
| 1 | 1 | 0 | W3 |
| 1 | 1 | 1 | W4 |

Figure 4:
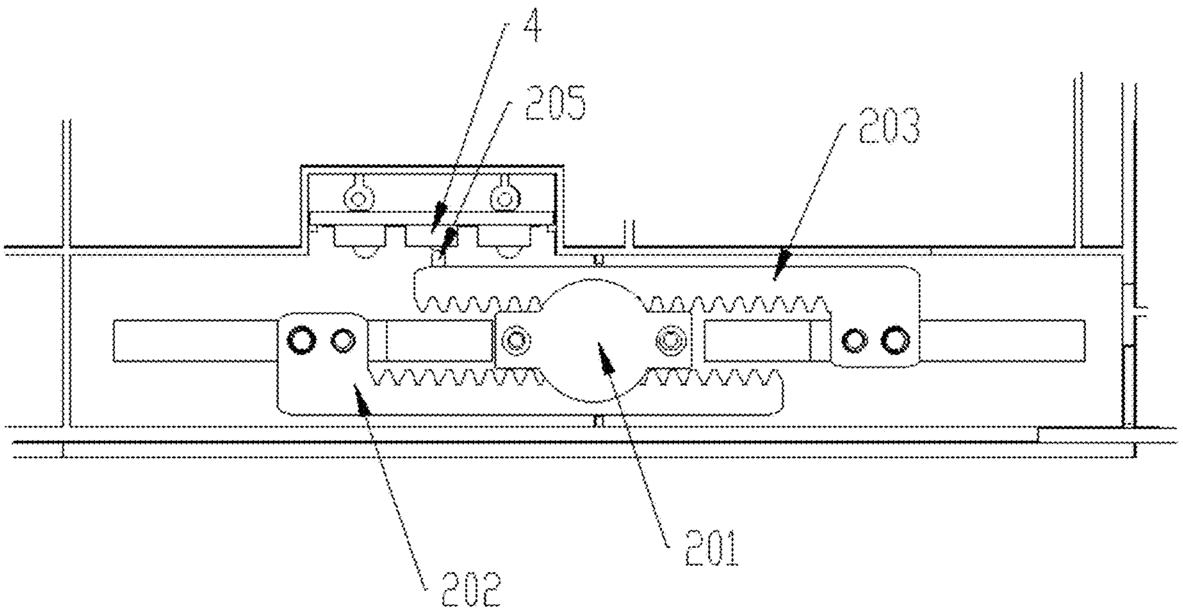
FIG. 4 is a schematic structural diagram of another structure for automatically measuring a paper width for a printer disclosed in an embodiment of the utility model.

In another optional solution, as shown in FIG. 4, a hemispherical bump 205 is arranged on one side, closer to the inductor 4, of an upper end surface of the right rack 203, the bump 205 is located in a vertical plane formed by multiple contact points, and the bump 205 sequentially comes into contact with the contact points on the inductor 4 when driven to slide. The solution is an alternative to a solution of direct contact between the upper end surface of the right rack 203 and the inductor 4, and the bump 205 is in direct contact with the inductor 4. In addition, the bump 205 is detachably installed on the upper end surface of the right rack 203, and correspondingly, a height for installing the inductor 4 is adjustable.

A signal transmitter coupled with the inductor 4 is also included, and the signal transmitter unidirectionally sends, to a mobile device or a computer with which communication has been established, a displacement signal output by the inductor 4. Therefore, the printer using the structure in this embodiment can automatically measure the paper width, and can report the automatically measured paper width to an application on a computer or a mobile phone, and then an editing interface size of label paper is automatically adjusted according to a label width, to reduce technical difficulty of using the printing device for the user, thereby reducing a printing error rate and improving printing efficiency and experience.

The foregoing embodiments are only intended to illustrate a technical idea and characteristics of the utility model, so that persons of ordinary skills in the art can understand content of the utility model and implement it accordingly, and the protection scope of the utility model is not limited thereto. Any equivalent changes or modifications made according to substance of the content of the utility model shall fall within the protection scope of the utility model.

The utility model discloses a structure for automatically measuring a paper width for a printer, including: a width adjustment mechanism installed in the printer and at least one restraint arm driven by the width adjustment mechanism, where an inductor is also arranged inside the printer, the width adjustment mechanism or the restraint arm comes into contact with the inductor when sliding unidirectionally, and the inductor outputs a corresponding displacement signal. Benefits of the utility model are as follows: The inductor is arranged inside the printer, and in this way, during use, the user can directly manually push the restraint arm or control the width adjustment mechanism to drive the restraint arm, so that the restraint arm properly clamps the paper. The width adjustment mechanism or the restraint arm comes into contact with the inductor when sliding, the paper width is indirectly measured according to a displacement signal output by the inductor, and the user can send, to the host computer, a displacement obtained by the inductor and determine the actual paper width through the preset mapping relationship in the host computer without needing a length measurement tool.

What is claimed is:

1. A structure for automatically measuring a paper width for a printer, comprising: a width adjustment mechanism installed in the printer and at least one restraint arm driven by the width adjustment mechanism, wherein an inductor is also arranged inside the printer, the width adjustment mechanism or the restraint arm comes into contact with the inductor when sliding unidirectionally, and the inductor outputs a corresponding displacement signal;

wherein the width adjustment mechanism comprises an adjustment gear and a right rack and a left rack meshing with upper and lower ends of the adjustment gear respectively, a restraint arm is fixed at each remote end of the right rack and the left rack, and an upper end surface of the right rack comes into contact with the inductor when sliding under drive of the adjustment gear;

wherein the inductor is a multipoint contact induction sensor, and a distribution direction of contact points on a surface of the contact induction sensor is consistent with a sliding direction of the right rack.

2. The structure for automatically measuring a paper width for a printer according to claim 1, wherein the two restraint arms are arranged in parallel at the paper inlet of the printer.

3. The structure for automatically measuring a paper width for a printer according to claim 1, wherein a guide slope is arranged on one side, closer to the inductor, of the upper end surface of the right rack.

4. The structure for automatically measuring a paper width for a printer according to claim 3, wherein the guide slope forms a fillet or a chamfer.

5. The structure for automatically measuring a paper width for a printer according to claim 1, wherein a hemispherical bump is arranged on one side, closer to the inductor, of an upper end surface of the right rack, the bump is located in a vertical plane formed by multiple contact points, and the bump sequentially comes into contact with the contact points on the inductor when driven to slide.

6. The structure for automatically measuring a paper width for a printer according to claim 5, wherein the bump is detachably installed on the upper end surface of the right rack.

7. The structure for automatically measuring a paper width for a printer according to claim 1, wherein a height for installing the inductor is adjustable.

8. The structure for automatically measuring a paper width for a printer according to claim 1, wherein the structure also comprises a signal transmitter coupled with the inductor, and the signal transmitter unidirectionally sends, to a mobile device or a computer with which communication has been established, a displacement signal output by the inductor.

* * * * *